No. 856,389. PATENTED JUNE 11, 1907.
T. C. BRASKETT.
COMPUTING CHEESE CUTTER.
APPLICATION FILED MAR. 22, 1905.

2 SHEETS—SHEET 1.

WITNESSES:
F. C. Gibson.
Edward L. Jewell.

INVENTOR
Thomas C. Braskett
BY Davis & Davis,
ATTORNEYS.

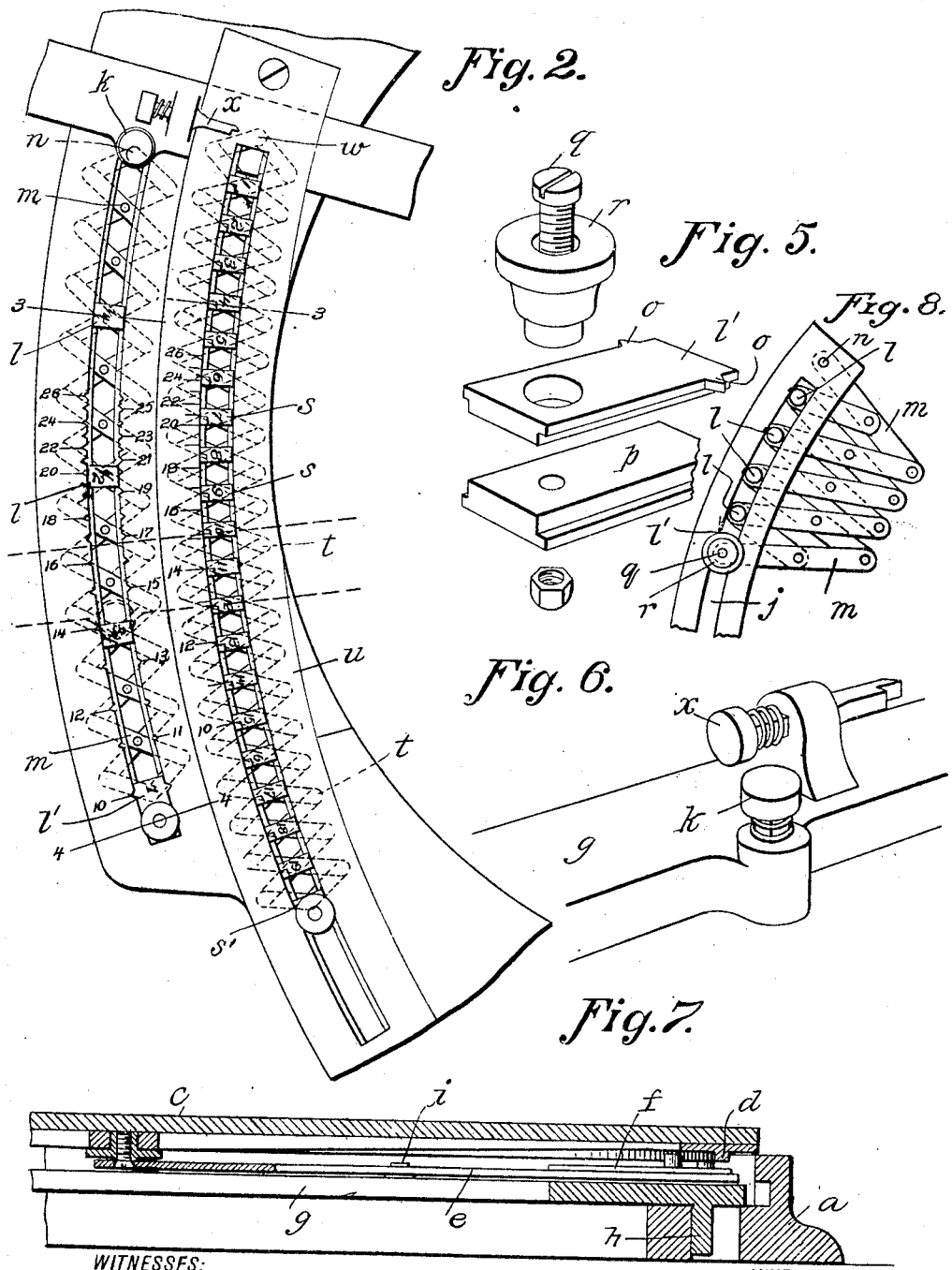

UNITED STATES PATENT OFFICE.

THOMAS C. BRASKETT, OF ANDERSON, INDIANA, ASSIGNOR TO THE ANDERSON COMPUTING SCALE COMPANY, OF ANDERSON, INDIANA, A CORPORATION OF INDIANA.

COMPUTING CHEESE-CUTTER.

No. 856,389. Specification of Letters Patent. Patented June 11, 1907.

Application filed March 22, 1905. Serial No. 251,486.

*To all whom it may concern:*

Be it known that I, THOMAS C. BRASKETT, a citizen of the United States of America, and a resident of Anderson, county of Madison, State of Indiana, have invented certain new and useful Improvements in Computing Cheese-Cutters, of which the following is a full and clear specification, reference being had to the accompanying drawing, in which—

Figure 1:
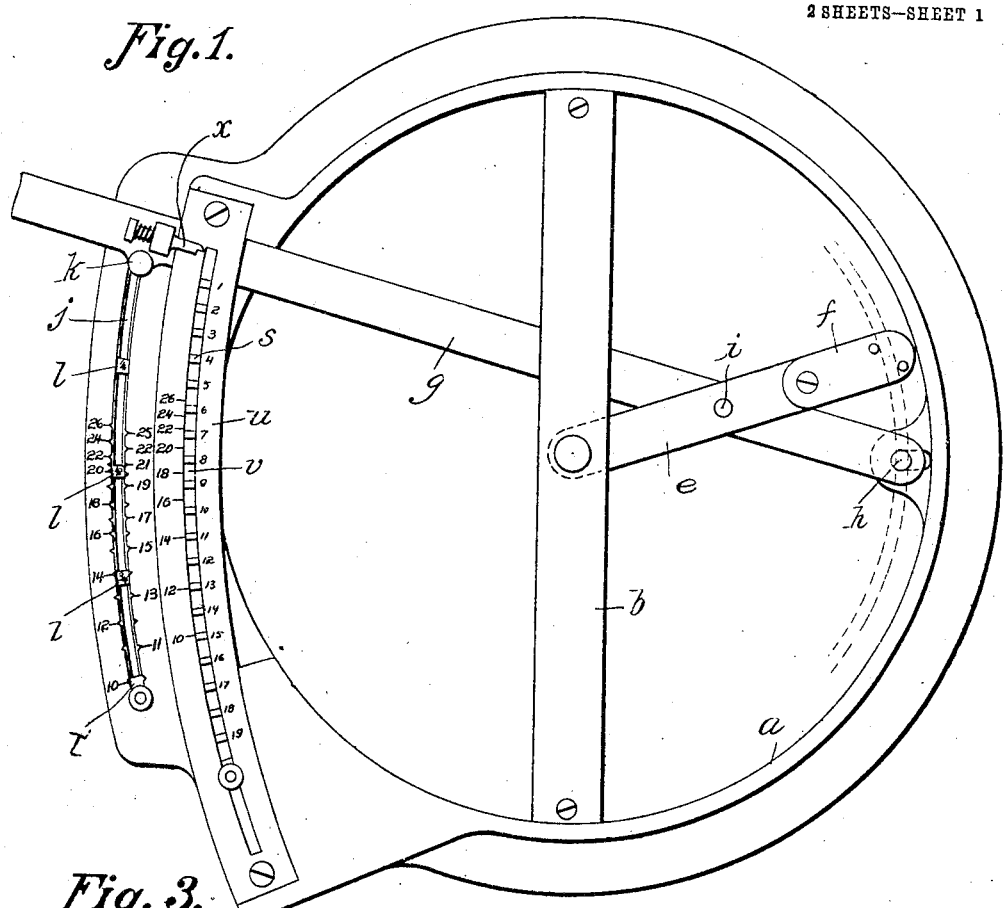
Figure 3:
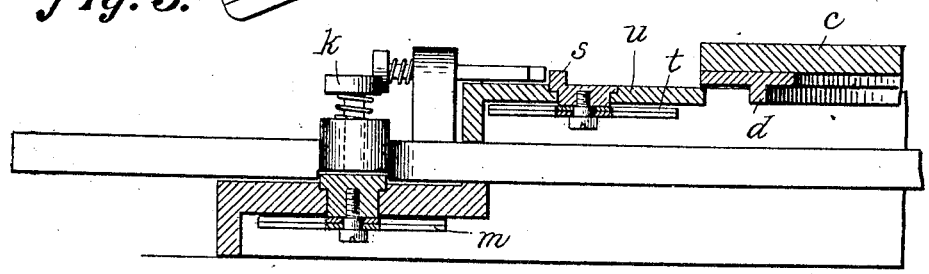
Figure 4:
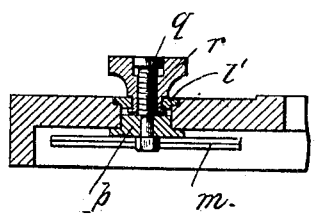

Figure 1 is a plan view with the cheese table removed to better show the parts; Fig. 2 is a similar view enlarged of the adjustable stops for determining the throw of the actuating lever; Fig. 3 a transverse section on the line 3—3 of Fig. 2; Fig. 4 a transverse section on the line 4—4 of Fig. 2; Fig. 5 a detail perspective view of the parts of the main or final stop separated; Fig. 6 a detail perspective view of a portion of the operating lever showing the spring actuated stop pins employed for the two scales; Fig. 7 a transverse section taken through the rear part of the apparatus; Fig. 8 is a plan view showing a modification of a lazy tongs feature.

This invention has special relation to that class of computing cheese cutters in which the throw of the operating lever is varied as the total weights of the cheeses vary, the lighter the cheese the longer the throw of the lever required to measure off one pound, as is obvious.

I have illustrated my improvement as being applied to a cheese-cutter of that type in which the actuating arm is pivoted concentrically with the table and carries a clutch at its outer end engaging a depending rim carried by the table, this actuating arm having a pivotal connection to the operating lever and the operating lever having a pivotal connection with the base frame at a point on the opposite side of the center of the table from that on which the handle end of the lever projects, but it is obvious that it may be applied to other types of cheese-cutters and that I do not wish to be limited in that respect.

The object of the present improvements is to provide simple and accurate devices for shifting the intermediate stops (that is, the stops employed to determine the throw of the lever for fractions of pounds) when the main or total weight stop is shifted in accordance with the total weight of the cheese, as more fully hereinafter set forth.

To the accomplishment of this object and such others as may hereinafter appear, the invention consists of the parts and combination of parts hereinafter fully described, and particularly pointed out in the appended claims, reference being had to the accompanying drawings forming a part of this specification, in which the same reference characters designate like parts throughout the several views.

Referring to the drawings by letters, *a* designates the base frame of the apparatus, *b* a transverse bar adapted to support the pivot of the cheese table *c*, which table is provided with an annular depending flange *d* near its edge. An arm *e* is pivoted to the bar *b* concentrically with the table and carries a clutch *f* at its outer end which is adapted to grip the flange *d* during its actuating stroke. The operating lever *g* is pivoted at pivot *h* to the base-frame which is slotted so that the lever shall have a limited longitudinal movement on its pivot, this movement being necessitated by the fact that this lever has a stationary pivotal connection at *i* to the actuating arm. The advantage in thus stationarily pivoting the lever to the clutch carrying arm and in having the lever moved bodily inward and outward during the actuating stroke thereof is that the distance between the fulcrum *h* and the point of application of the load at *i* always remains the same irrespective of the position of the lever, whereby any given part of the movement of the lever will shift the table the same distance as any other given part of the stroke of the lever, this being especially advantageous in an apparatus of the type herein disclosed where the stops or indicating devices are shifted proportionately for different weights or different prices.

The base ring or frame is slotted at *j*, this slot lying just under the handle or projecting end of the lever and being arc-shape so that it shall lie in the path of the spring actuated stop-pin *k* carried by the lever and adapted to be depressed so as to strike, at the will of the operator, any one of a series of stops *l* slidingly mounted in the slot *j*. These stops *l* are carried by a lazy-tongs device *m* supported under the top plate in which the slot *j* is formed and having its inner end pivoted stationarily at *n* to said top plate and its outer end movably pivoted to the main or final stop $l'$. The first one of the stops $l$, marked with the fraction 1/4 is for a quarter of a pound, the second marked with the fraction 1/2 is for a half of a pound, the third for 3/4 of a pound, and the final stop for a full pound, as is obvious. Thus mounting the intermediate stops upon lazy-tongs insures the simultaneous and proportional movement of these stops whenever the final stop is adjusted to vary the full throw of the lever. In this way accurate fractions of a pound of a cheese of any weight within the capacity of the apparatus may be measured off, without adjusting the connection between the actuating arm $e$ and the lever or the connection of the lever with the base-ring.

A total weight scale is marked off on one or both edges of the slot $j$ so as to guide the operator in setting the final stop $l'$, and for the sake of accuracy and to prevent the final stop from being shifted by the blows of the lever, I prefer providing said stop with lateral projections $o$ which are adapted to engage notches in the edges of the slot $j$ at the graduation marks of the scale.

The stop $l'$ forms a part of a clamp, the under part of said clamp being a plate $p$ sliding in the slot $j$ and the two plates $l'$ and $p$ being connected by a vertical screw $q$, a clamp nut $r$ being provided to draw said plates together to clamp the edges of the slot and thereby lock the final stop at its adjusted point.

If a price unit or money's worth scale is desired in connection with the weight-scale described, I prefer employing a similar device to carry the stops for the price-scale. In the drawing I show the price unit stops $s$ mounted in a similar manner on lazy-tongs $t$ supported under an arc-shape plate $u$ provided with an arcuate slot $v$ in which said stops $s$ work. These lazy-tongs are pivoted at $w$ stationarily to the under side of the plate $u$ or to an adjacent part of the base ring and at their outer end to a final stop $s'$. As many of these intermediate stops $s$ may be employed as may be found convenient. I have shown in the drawings nineteen of them which, together with the final stop, permits the throw of the lever to be divided into twenty parts, thus providing one cent divisions for cheese selling as high as 20 cents per pound. A spring actuated stop pin $x$ is mounted on the lever in such position that it may be projected into the path of these stops at the will of the operator.

After the weight stops are properly adjusted and it is desired to set the price scale with relation thereto, the lazy-tongs carrying the price stops are adjusted so as to bring the stops representing the price per pound the cheese is selling at in such a position with relation to stop $l'$ that when the stop-pin $k$ strikes said stop $l'$ said stop $s$ will be in position to be struck by stop-pin $x$; thus the throw of the lever will be divided into as many parts as there are cents at the price at which the cheese is selling. For example, as shown in Fig. 2 the weight stops are adjusted for a cheese having a total weight of ten pounds and the price unit stops are adjusted for a cheese selling at 15 cents a pound. With these intermediate equi-distance penny stops it is obvious that the operator may measure off any amount of cheese by money's worth up to 16 cents worth by simply causing the stop-pin $x$ to engage the stop corresponding with the amount the purchaser calls for. It is obvious that if it be not desired to make such fine sub-divisions as one cent's worth, the number of intermediate price stops may be lessened without departing from the invention in the least; for instance, every other stop might be omitted or every fifth stop only might be employed.

If it be desired to use the price stops without, or independently of, the weight stops this may be done by providing the bar $u$ with the usual total-values scale, such, for instance, as is adapted to measure off 5 cents' worth of cheese with each stroke, as is well known in this art.

Instead of mounting the stops in the center of the lazy-tongs, that is, at the points of intersection of the bars, it is obvious that I may mount them on the ends of the bars as shown in Fig. 8; and it is also obvious that the upper links and likewise the lower links, as shown in Fig. 8, will have to be set at an angle to each other in order to permit the stops carried thereby to adjust themselves without strain on the links to the curved slot, but this angular arrangement of the links will not be a draw-back since the lazy-tongs may close sufficiently notwithstanding this angular arrangement.

It will be apparent to those skilled in the art that various mechanical embodiments of the invention are possible and I, therefore, do not wish to be limited to the exact arrangement and construction shown.

What I claim and desire to secure by Letters Patent is:

1. In a cheese cutter, the combination of a base, a rotatable table thereon, an operating device and means actuated by it to engage and turn the table, a series of stops working in an arcuate slot in the base to regulate and vary the throw of the operating device, and means for proportionately and simultaneously adjusting these stops, for the purpose set forth.

2. In a computing cheese-cutter, the combination of a base and a table rotatably mounted thereon, a vibrating lever and means actuated thereby for turning the table, a movable final stop for limiting the throw of the lever, a series of intermediate stops, and means connecting all the stops whereby the shifting of the final stop alone will proportionately and simultaneously shift the intermediate stops, said connecting means being attached to the base at one end and to the final stop at its other end.

3. The combination with a base and a table rotatably mounted thereon, of a vibrating lever and means actuated thereby for turning the table, a movable stop for limiting the throw of the lever, a series of intermediate stops and means whereby the shifting of the final stop will proportionately and simultaneously shift the intermediate stops, said means consisting of lazy-tongs carrying the stops, for the purpose set forth.

4. The combination with a base and a table rotatably mounted thereon, of a vibrating lever and means actuated thereby for turning the table, a movable stop for limiting the throw of the lever, a series of intermediate stops and means whereby the shifting of the final stop will proportionately shift the intermediate stops, said means consisting of a lazy tongs carrying the stops and supported underneath the base, said base being provided with a guide slot in which said stops work.

5. In a cheese cutter, the combination of a support for the cheese, a knife adapted to move in a plane radial to the cheese when on said support, an oscillating part adapted to change the relative angular position of said knife and support in proportion to the extent of its travel, a stop upon each side of said oscillating part, means for varying the position of one of said stops to limit the motion of the oscillating part, a series of stops for limiting proportional parts of the travel of the oscillating part at all positions of the movable stop, and a curved guide slot in which said stops work.

6. In a cheese cutter, the combination of a base, a rotatable table thereon, a vibrating lever and means actuated by it to engage and turn the table, a weight scale on the base embodying a series of stops and means for proportionately shifting them, means on the lever for engaging any one of these stops, a price scale on the base and also embodying a series of stops and means for proportionately adjusting them with reference to the stops of the weight scale, and means on the lever for engaging any one of the stops of the total value scale.

7. In a computing cheese-cutter, the combination of a base and a rotatable table mounted thereon, an arm pivoted, to the base concentrically with the table and carrying means at its free end for intermittently engaging the table, an actuating lever having a pivotal connection with said arm and being fulcrumed to the base, said fulcrum consisting of a pivot stationarily carried by the lever and a radial slot in the base in which said pivot slides and turns, and scale-controlled means for limiting the movement of the lever.

8. In a computing cheese-cutter, the combination with a base and a rotatable table mounted thereon, of a vibrating lever and means actuated thereby for turning the table, a movable stop for limiting the throw of the lever, a series of intermediate stops, and means whereby the stops may be shifted proportionately, said means consisting of a series of pivotally connected links and means for guiding the stops in their movements.

9. In a computing cheese cutter, the combination of a base and a rotatable table thereon, a vibratable lever and means actuated thereby to engage and turn the table, a total weight scale on the base, a final stop shiftable along this scale to vary the maximum throw of the lever in accordance with the different weights of cheeses, a price scale on the base adjacent to the total weight scale, this price scale embodying a series of stops, and means for proportionately shifting these stops with reference to the final stop of the total weight scale, substantially as set forth.

In testimony whereof I hereunto affix my signature in the presence of two witnesses this 16th day of March 1905.

THOMAS C. BRASKETT

Witnesses:
GLAD. S. KING,
LAURA A. KING.